I. BAUER.
AUTOMOBILE SIGNALING DEVICE.
APPLICATION FILED OCT. 2, 1915.
1,195,642.
Patented Aug. 22, 1916.
3 SHEETS—SHEET 2.
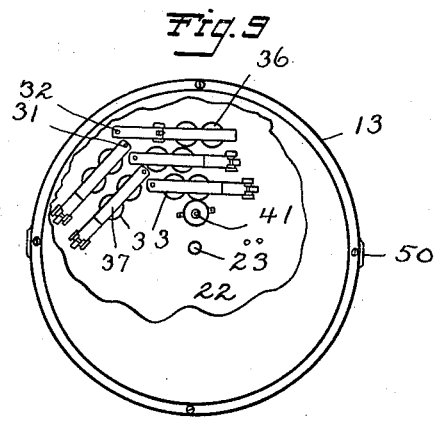
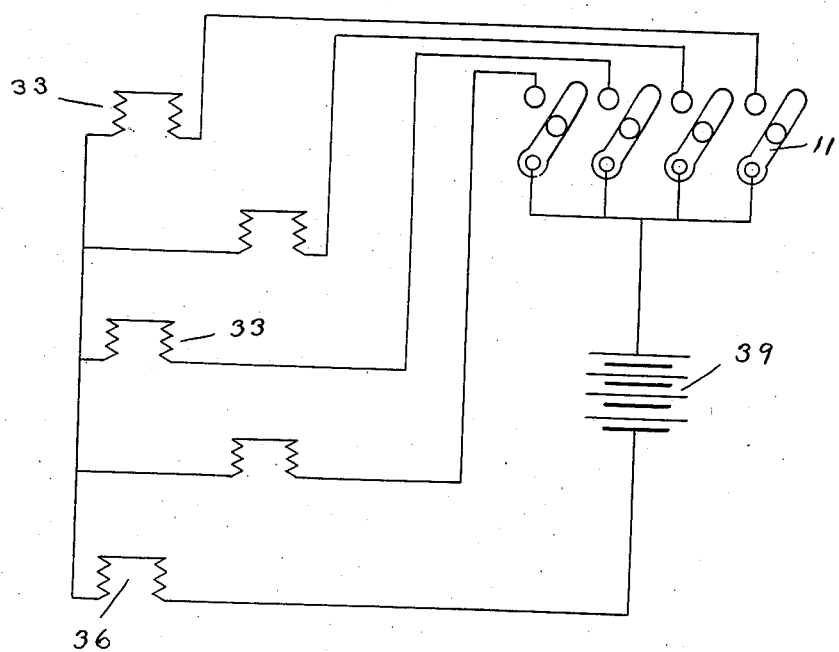

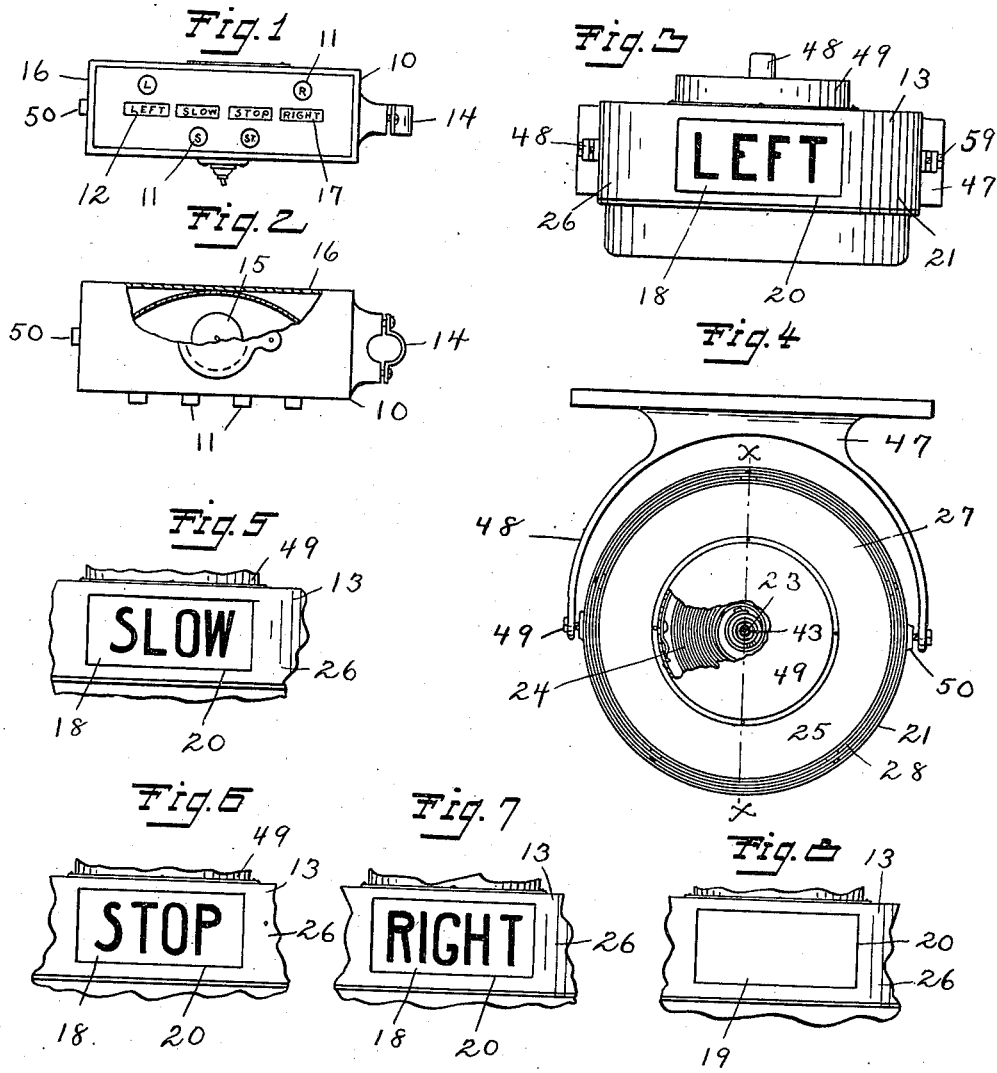

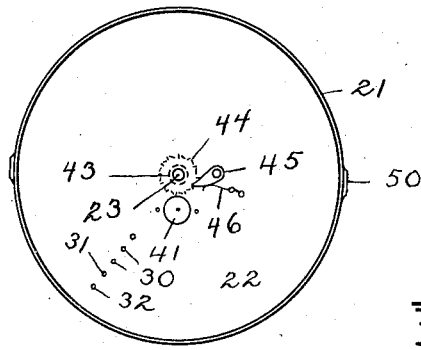
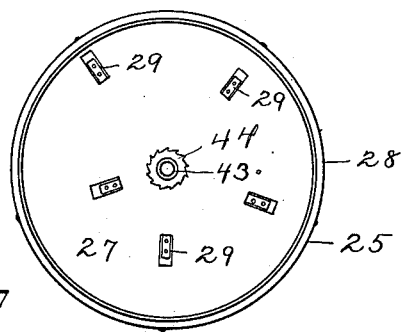
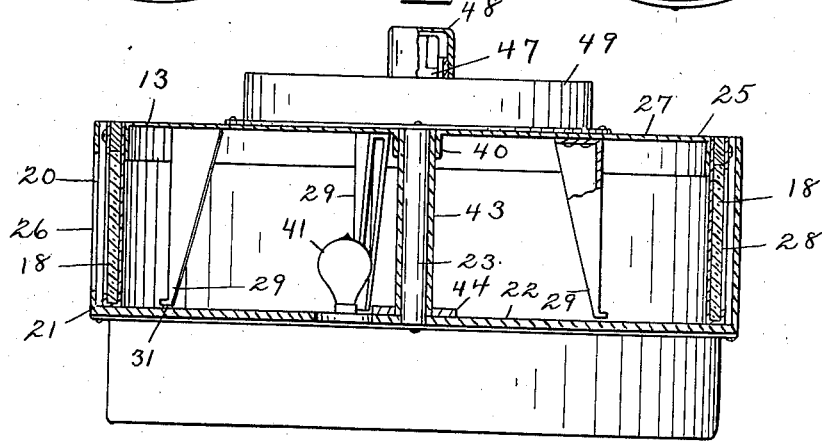
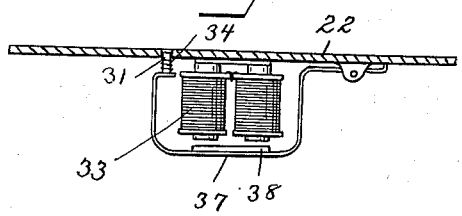
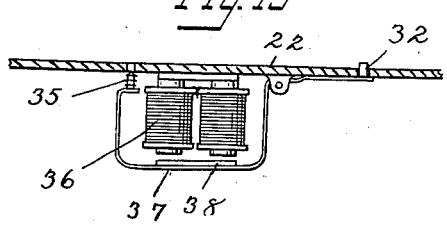

UNITED STATES PATENT OFFICE.

ISAAC BAUER, OF MIDDLETOWN, CONNECTICUT.

AUTOMOBILE SIGNALING DEVICE.

1,195,642.            Specification of Letters Patent.    Patented Aug. 22, 1916.

Application filed October 2, 1915. Serial No. 53,778.

*To all whom it may concern:*

Be it known that I, ISAAC BAUER, a citizen of the United States, residing at Middletown, in the county of Middlesex and State of Connecticut, have invented certain new and useful Improvements in Automobile Signaling Devices, of which the following is a specification.

My invention relates to improvements in automobile signaling devices whereby the operator of an automobile may indicate the intended movement or change of movement of the machine he is operating, particularly for the benefit of operators of vehicles at the rear and to avoid accidents due to collisions, and the object of my improvement is to produce a device for the purpose described that can be operated to indicate the intended change of movement by depressing a particular push button, there being a set of such push buttons comprising one for each change of movement to be indicated, and which device will furthermore return to non-indicating or blank position automatically after the release of the push button that is operated.

The device is furthermore adapted for both night time and day time use, there being means for illumination provided for both the indicator proper and for the panels or markers for designating the different push buttons.

Furthermore, the said device is electrically controlled, and in combination with mechanically operated actuating mechanism for the indicating device, such as a spring. The said spring would be of sufficient power to be serviceable after being wound up for a period of a couple of weeks or so, so that the only attention required to keep the device in operating condition would be to wind the spring occasionally.

In the accompanying drawing:—Figure 1 is a front elevation of the controller. Fig. 2 is a plan view, in part broken away, of the same. Fig. 3 is a front elevation of the indicator. Fig. 4 is a plan view of the same. Figs. 5, 6, 7, and 8 are front elevations, in part broken away, of the indicator, showing different indications from that shown in Fig. 3. Fig. 9 is a bottom view, in part broken away, of the indicator. Fig. 10 is a diagrammatic view of the electrical connections. Fig. 11 is a plan view of the casing of the indicator, the ratchet wheel being indicated in broken lines. Fig. 12 is a bottom view of the moving member. Fig. 13 is a sectional view on an enlarged scale on the line x x of Fig. 4. Fig. 14 is a side elevation of one of the inner magnets and adjacent parts. Fig. 15 is a similar view of the outer magnet.

My improved automobile signaling device comprises a controller 10 that is provided with a set of electrical switches or push buttons 11 and suitable markers 12 therefor and an indicating device 13 that is adapted to give indications responsive to the operation of the push buttons 11. The controller 10 is secured at a position convenient to be manipulated by the operator of the car, being preferably secured to the steering post by a suitable clamping device 14.

As shown there are four push buttons 11, arranged in pairs, and the marker 12 is in the form of a window 17 and a lamp 15 is housed in the interior of the casing 16, which serves to light the marker for night time use. The markers 12 as shown are one each reading Left, Slow, Stop, and Right, and the heads of the push buttons 11 are provided with a similar marking or an abbreviation of the same as shown.

The windows 17 are of different colored glass, that for Left being yellow, for Right blue, and that for Slow being green, and that for Stop being red, the colors being similar to those used for the different indicating plates 18 of the indicator for the indications corresponding to the different push buttons 11. There are accordingly four indicating plates 18, one for each of the markers 12 of the controller, and in addition thereto one blank or black indicating plate 19, and these are displayed one at a time as desired through a display opening 20 in the casing 21 of the indicator 13.

The indicator comprises the casing 21 which is generally cylindrical in form, having appreciable depth, the display opening 20 being in the side wall 26. At the lower end of the casing 21 is a body plate 22. A vertical shaft 23 extends axially through the casing 21 and body plate 22, being fixedly supported by the latter, and adjacent the upper end is a spring 24, the latter being provided with suitable winding mechanism of ordinary character. One end of the spring 24 is connected to the sleeve 43, mounted on the shaft 23, and the other to a moving member 25.

The moving member 25 comprises a plate 27 immediately below the spring 24, which is secured by means of a hub 40 to the sleeve 43, and which has depending from the periphery a generally double walled frame structure 28, which is of course of cylindrical form, and which is open at the upper edge portion at intervals suitably to receive the indicator plates 18 and 19, the latter having suitable curvature and thickness to be received and to fit therein. The frame 28 is positioned within the cylindrical wall 26 of the casing 21 and is concealed thereby at all positions except at the display opening 20. The spring 24 tends to rotate the moving member 25 relatively to the casing 21 and means are provided for selectively bringing the different display plates 18 in registration with the display opening 20 as desired comprising stop fingers 29 depending from the plate 27 cooperating with a set of magnet stops to be described.

The fixed plate 22 has a set of holes 30 through which the magnet stops project upwardly for engaging with the depending stops 29, and on the under side of the fixed plate 22 are supported magnets for operating the magnet stops. There are five holes 30, generally in a radial line and the depending stops 29 are in registration therewith and with the magnet stops when projected therethrough, suitably to be engaged therewith and thereby stop the rotative movement of the moving member 25. The magnet stop 32 in the outermost hole 30 engages with the corresponding outermost dependent stop or finger 29 and serves to bring the blank display plate 19 in registration with the display opening 20. The four innermost magnet stops 31 register with proper dependent fingers 29 for bringing the other different display plates 18 into registration with the display opening 20. The said innermost magnet stops 31 are operated each by an inner magnet 33, and are projected upwardly into engaging position when the said inner magnets 33 are energized. They are drawn from engaging position by the springs 34, and the same are normally held by the said springs 34 in the disengaging position. The outer magnet stop 32 is normally held in engaging position by the spring 35 and is withdrawn from such engaging position when the outer magnet 36 is energized. The inner magnet stops 31 are supported by a suitable lever 37, that shown being of the third class, the armature 38 being adjacent the middle portion. When the armature 38 is raised the magnet stop 31 is also raised. The spring 34 is positioned between the plate 22 and the lever 37. The outer magnet stop 32 is supported by a lever 37 of the first class, so that when the armature 38 is raised by energizing the magnet 36 the magnet stop 32 is lowered, and drawn away from the engaging position. The spring 35 operates in opposition to the magnet 36, and tends to hold the outer magnet stop 32 in the engaging position. Thus the outer magnet stop 32 serves normally to hold the blank display plate in position for observation and the inner magnet stops 29 are inoperative.

The electrical connections are arranged so that when the desired push button 11 is operated the proper inner magnet 33 is energized, and serves to bring the proper inner magnet stop 31 to the engaging position, suitably to serve as the stop for the moving member 25, and also to energize the outer magnet 36 so that the outer magnet stop 32 is withdrawn from the engaging position and thereby releasing the moving member 25 and permitting the desired movement thereof. Thus one terminal of each of the switches or push buttons 11 is connected individually to one side of the battery 39 or source of supply and the coils of the outer magnet 36 are always in line with the said battery and a divided connection extends from the line to one terminal of each of the coils of the inner magnets 33. The other terminals of the coils of the inner magnets 33 are connected to the proper switch or push button 11, so as to permit the desired selective operation of the said inner magnets 33. That is to say, all of the switches have one terminal connected to a common lead connecting through the battery and the coils of the outer magnet 36 to one terminal of all of the coils of the inner magnets 33, and separate, individual connections serve to connect each of the other terminals of the switches or push buttons with one of the other terminals of a coil for an inner magnet 33.

A lamp 41 is supported by the body plate 22 and has the bulb portion housed within the interior of the indicator 13, being positioned behind the display opening 20 suitably to illuminate the display plates 18 as they are brought into registration with the display opening 20. As stated, the blank or black display plate 19 is normally visible.

In operation, when it is desired to display a signal the proper button 11 is depressed. The result is that the hold of the outer magnet stop is released, permitting a movement of the moving member by the main spring, and such movement is arrested by the proper magnet stop for effecting the display of the desired signal or indication. Upon release of the hold on the push button the parts are returned to the normal position by the cooperation of the magnet springs that move the magnet stops and the main spring which brings the moving member to such normal position, with the blank or black display plate exposed.

It will be noted that the four innermost magnet stops 31 operate in the same direction as the armatures 38 that are operated by the corresponding magnets 33, and are accordingly positive in their movement and the outer magnet stop 32 is negative in its movement, being withdrawn from engaging position when the outer magnet 36 is energized.

The inner end of the main spring 24 is operatively connected to the stationary shaft 23 through the medium of the sleeve 43. The said sleeve 43 is loosely mounted on the said shaft 23 and is operatively connected therewith by means of the ratchet wheel 44, which is secured to the said sleeve 43, and the pawl 45 and pawl spring 46, which are mounted on the body plate 22. The sleeve 43 is exposed at the upper end 47, which upper end is non-circular in form, suitably to be engaged by a key for winding.

The indicator is supported by the car and is positioned at any point desired for displaying the signals so that they will be visible to the operator of a car at the rear. As one means of support I provide a forked bracket 47 which can be secured to the car. The side arms 48 are provided with screws 59 for engaging with sockets in lugs or bosses 50 on the side wall 26 of the casing 21.

It will be noted that the position for displaying the blank indicator is assumed simply by releasing the push button 11, without any direct manipulation or action on the part of the operator, the condition mentioned being attained essentially automatically.

The upper end 47 of the sleeve 43 which is non-circular and receives the key for winding may be normally closed by a removable cap 48 which latter is supported by a housing 49 that incloses the main spring 24, which housing rests on the plate 27 and has a hole through which the sleeve 43 projects.

The push buttons 11 may be arranged in various ways. As shown they are arranged in pairs or two rows. Those for Left and Right being in the upper row, and those for Slow and Stop in the lower row. Furthermore, the first two mentioned are respectively at the extreme left and right, being in the corresponding upper corners, and above their markers, and the other two at the middle and below the markers. Then there is the least possibility of confusion. At some part of the controller is an extra push button 50 for operating the signal horn.

It is apparent that some changes from the specific construction herein disclosed may be made, and therefore I do not wish to be understood as limiting myself to the precise form of construction shown and described, but desire the liberty to make such changes, in working my invention, as may fairly come within the spirit and scope of the same.

As described, the indicator display member is brought to the normal position for exposing the blank or black display device, independent of the operator, as soon as the circuit closing device for exposing the desired special display device has been released, there being one less in number of the circuit closing devices than signals or display devices.

What I claim as my invention is:—

1. An automobile signaling device comprising a controller having a series of circuit closing devices and an indicator, the said indicator comprising a fixed part, a moving part rotatively mounted on the said fixed part, having a plurality of display plates at the periphery and a corresponding number of fingers, means tending to rotate the said moving member, spring positioned stops movably mounted on the said fixed part for engaging with the said fingers, magnets for operating the said stops responsive to operation of the said circuit closing devices, and the said stops consisting of an individual stop corresponding to each of the said circuit closing devices and an extra stop, suitable for coöperating normally with its finger independently of the said circuit closing devices.

2. An automobile signaling device comprising a controller having circuit closing devices, and an indicator, the said indicator comprising a fixed member having a body plate, a shaft supported from said body plate, and a cylindrical side wall having a display opening, and a moving member, mounted on the said shaft, having a generally cylindrical peripheral wall provided with a plurality of display plates and a corresponding number of stop fingers, means tending to rotate the said moving member, stops movably mounted on the said fixed member for engaging with the said fingers, spring means for one of the said stops tending to hold the same in the engaging position and other spring means for each of the other stops tending to hold each of the said other stops in position of disengagement with its finger, magnets for each of the said stops for operating the same in opposition to the said spring means, the magnets for the said other stops being connected each to one of the said circuit closing devices, and the magnet for the said one stop being connected in circuit with the supply and connected with each of the other magnets.

3. In combination in an automobile signaling device, a casing having a vertical shaft and a cylindrical side wall provided with an opening, a moving member mounted on the said shaft, and having a plurality of display plates, means tending to rotate the said moving member, controlling means for the said moving member comprising fingers on the said moving member and movable stops operatively mounted on the said casing, spring means for positioning each of the said movable stops, magnets for moving the said stops in opposition to the said fingers, stops and magnets corresponding in number to the said display plates, one of the said stops being operated negatively by its magnet and the other of the said stops being operated positively by their magnets, and a controller having circuit closing devices corresponding in number to the said positively operated stops.

4. An automobile signaling device comprising in combination a casing of cylindrical form having a display window in the side wall, a display member, rotatively mounted in the said casing, having a plurality of display devices for being brought into registration with the said window, motor means tending to rotate the said display member, the said display member having a plurality of fingers corresponding in number to the number of said display devices, a set of circuit closing devices comprising in number one less than the number of the said display devices, a set of spring magnet controlled stops corresponding in number to the number of the said circuit closing devices suitable for selectively coöperating each with one of the said fingers, and a spring and magnet controlled stop for normally engaging with one of the said fingers, and operative to release its finger when each of the said circuit closing devices is operated.

5. In an automobile signaling device, a display member rotatively mounted, and having a selective finger and a normal finger, a selective stop for coöperating with the said selective finger and a normal stop for coöperating with the said normal finger, spring means tending to hold the said selective stop in disengaging position, spring means tending to hold the said normal stop in engaging position, and magnets for operating each of the said stops having their coils in series, whereby the said magnets will be simultaneously energized, and the normal stop and finger will be disengaged, and the selective stop will be moved to the engaging position.

ISAAC BAUER.

Witnesses:
 FRED H. CARPENTER,
 THOMAS H. CONROY.